(12) United States Patent
Qian et al.

(10) Patent No.: US 12,215,245 B2
(45) Date of Patent: Feb. 4, 2025

(54) AQUEOUS COATING COMPOSITION

(71) Applicants: Rohm and Haas Company, Collegeville, PA (US); Dow Global Technologies LLC, Midland, MI (US)

(72) Inventors: Zhen Qian, Shanghai (CN); Wei Cui, Shanghai (CN); Jianming Xu, Shanghai (CN)

(73) Assignees: Midland Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 700 days.

(21) Appl. No.: 17/417,937

(22) PCT Filed: Jan. 29, 2019

(86) PCT No.: PCT/CN2019/073676
§ 371 (c)(1),
(2) Date: Jun. 24, 2021

(87) PCT Pub. No.: WO2020/154888
PCT Pub. Date: Aug. 6, 2020

(65) Prior Publication Data
US 2022/0089897 A1    Mar. 24, 2022

(51) Int. Cl.
| C09D 133/02 | (2006.01) |
| C08L 91/06 | (2006.01) |
| C09D 143/02 | (2006.01) |
| C09D 191/06 | (2006.01) |

(52) U.S. Cl.
CPC ............ C09D 133/02 (2013.01); C08L 91/06 (2013.01); C09D 143/02 (2013.01); C09D 191/06 (2013.01)

(58) Field of Classification Search
CPC . C08L 91/06; C09D 191/06; C08F 220/1809; C08F 220/1811; C08F 220/1812; C08F 220/1818
See application file for complete search history.

(56) References Cited

U.S. PATENT DOCUMENTS

| 9,388,323 | B2 | 7/2016 | Zong et al. |
| 2002/0128367 | A1* | 9/2002 | Daisey, Jr. ............... B05D 7/08 524/502 |
| 2013/0035430 | A1 | 2/2013 | Li et al. |
| 2013/0047892 | A1 | 2/2013 | Palmer, Jr. |
| 2014/0275388 | A1 | 9/2014 | Rokowski et al. |
| 2015/0011790 | A1* | 1/2015 | Ogasawara ........... C07C 309/24 558/175 |
| 2015/0073080 | A1 | 3/2015 | Wu et al. |
| 2015/0166474 | A1* | 6/2015 | Murata .................... C08K 5/41 524/556 |

FOREIGN PATENT DOCUMENTS

| BR | 0924063 | 7/2015 | |
| CN | 101977974 | 2/2011 | |
| CN | 102858814 | 1/2013 | |
| JP | 2015011316 A * | 1/2015 | |
| JP | 2017102382 A * | 6/2017 | |
| WO | 2010082918 A1 | 7/2010 | |
| WO | 2015051514 | 4/2015 | |
| WO | 2017214962 A1 | 12/2017 | |
| WO | 2018119835 A1 | 7/2018 | |
| WO | WO-2019163918 A1 * | 8/2019 | ........... C03C 17/009 |

OTHER PUBLICATIONS

Machine translation of JP 2017102382 (2017, 9 pages).*
Machine translation of JP 2015011316 (2015, 19 pages).*
Michelman (Michem Lube 270R, Michelman, 2024, 3 pages).*
Machine translation of WO-2019163918-A1 (2019, 43 pages).*
International Search Report and Written Opinion for the corresponding INternational Application No. PCT/CN2019/073676; International Filing Date: Jan. 29, 2019; Date of Mailing: Oct. 22, 2019; 11 pages.

* cited by examiner

*Primary Examiner* — Brieann R Johnston
(74) *Attorney, Agent, or Firm* — Dennis J. Jakiela

(57) ABSTRACT

The present invention provides an aqueous dispersion and an aqueous coating composition comprising the aqueous dispersion that provides coatings with improved durable water and ink repellency properties without compromising early water repellency.

10 Claims, No Drawings

AQUEOUS COATING COMPOSITION

FIELD OF THE INVENTION

The present invention relates to an aqueous dispersion and an aqueous coating composition comprising the same.

Introduction

Liquid stain repellency is one of key performance requirements for coating films. Liquid stain repellency is coating films' resistance to being wetted by liquid stains such as water, resistance to being adhered by liquid stains on the coating films, and how easily liquid stains can be removed from the coating films.

In the coating industry, one of the commonly used additives to repel water is wax. Wax tends to migrate to the surface of dry coating films and reduces the surface tension, thereby improving beading effect. For interior coatings, it is desirable for coating compositions to not only provide early water repellency, for example, 2 hours after application of coating compositions, but also durable liquid stain repellency. WO2015/051514A1 relates to a coating composition comprising, by dry weight based on the total dry weight of the coating composition, i) from 12% to 80% of polymer particles comprising, as polymerized units, by dry weight based on the total dry weight of the polymer particles, from 25% to 90%, of a vinyl acetate; and from 5% to 75%, of a vinyl ester of versatic acid and/or a vinyl ester of 2-ethyl hexanoic acid; and ii) from 0.1% to 6% of a wax; and iii) from 14% to 55% of a pigment. Such coating composition provided coatings with improved liquid stain repellency. However, it is difficult to maintain such liquid stain repellency, e.g., beading scores after wet brushing are typically close to zero.

It is therefore desired to provide an aqueous coating composition that can provide coating films made therefrom with durable liquid stain repellency without compromising early water repellency.

SUMMARY OF THE INVENTION

The present invention provides a novel aqueous dispersion by combining a specific emulsion polymer with a certain amount of a wax, and an aqueous coating composition comprising the aqueous dispersion. The aqueous coating composition of the present invention can provide coatings with good early water repellency and surprisingly improved durable liquid stain repellency as indicated by durable water repellency and durable ink repellency both showing beading scores higher than 3. These properties may be measured according to the test methods described in the Examples section below.

In a first aspect, the present invention is an aqueous dispersion comprising:
(A) an emulsion polymer with a Tg of −45° C. or more comprising, by weight based on the dry weight of the emulsion polymer,
structural units of a polymerizable surfactant having the structure of formula (I):

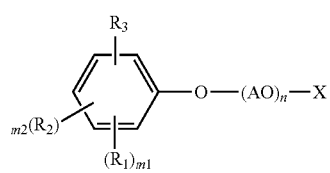

(I)

wherein each $R_1$ is independently a phenyl group or a phenyl substituted alkyl group; m1 is 1, 2, 3 or 4; each $R_2$ is independently an alkyl or a substituted alkyl; m2 is 0, 1, or 2; $R_3$ is hydrogen or —C($R_4$)=CH($R_5$), wherein $R_4$ and $R_5$ are each independently hydrogen or a $C_1$-$C_{20}$ alkyl group; A represents an alkylene group or a substituted alkylene group, having 2 to 4 carbon atoms; n is an integer in the range of from 1 to 100; X represents hydrogen, —(CH$_2$)$_a$—SO$_3$M, —(CH$_2$)$_b$—COOM, —PO$_3$M$_2$, —P(Z)O$_2$M, or —CO—CH$_2$—CH (SO$_3$M)-COOM, wherein a and b are each independently an integer of from 0 to 4, Z represents a residual obtained by removing X from formula (I), and each M independently represents hydrogen, an alkali metal cation, an alkaline earth metal cation, NH$_4^+$, an aminium ion having an ethylenically unsaturated bond, an imidazolium ion having an ethylenically unsaturated bond, a pyridinium ion having an ethylenically unsaturated bond, a pyrrolidinium ion having an ethylenically unsaturated bond, or a piperidinium ion having an ethylenically unsaturated bond; provided that only one of $R_3$ and X contains an ethylenically unsaturated bond;

from 0.3% to 10% of structural units of an ethylenically unsaturated monomer carrying at least one functional group selected from an amide, ureido, carboxyl, carboxylic anhydride, hydroxyl, sulfonic acid, sulfonate, phosphoric acid, or phosphate group, or a salt thereof;

from 3% to less than 30% of structural units of a $C_9$-$C_{30}$-alkyl ester of (meth)acrylic acid; and from 65% to 95% of structural units of an additional ethylenically unsaturated nonionic monomer; and (B) more than 1% by solids weight of a wax, based on the dry weight of the emulsion polymer.

In a second aspect, the present invention is a method of preparing the aqueous dispersion of the first aspect. The method comprises: admixing the emulsion polymer with more than 1% by solids weight of a wax, based on the dry weight of the emulsion polymer.

In a third aspect, the present invention is an aqueous coating composition comprising the aqueous dispersion of the first aspect.

DETAILED DESCRIPTION OF THE INVENTION

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" in the present invention can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

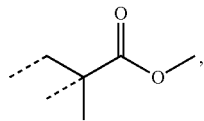

where the dotted lines represent the points of attachment of the structural unit to the polymer backbone.

The aqueous dispersion of the present invention comprises an emulsion polymer. The emulsion polymer useful in the present invention comprises structural units of one or more polymerizable surfactants. The polymerizable surfactant can be a monoethylenically unsaturated surfactant monomer that contains one ethylenically unsaturated bond. The polymerizable surfactant may have the structure of formula (I),

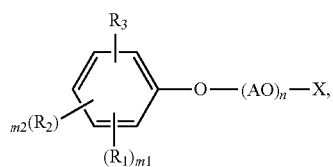

(I)

wherein each $R_1$ may be the same or different and is independently a phenyl group or a phenyl substituted alkyl group;

m1 is 1, 2, 3 or 4, preferably from 1 to 3, more preferably 3;

each $R_2$ may be the same or different and is independently an alkyl or a substituted alkyl, preferably a $C_1$-$C_4$ alkyl or a substituted $C_1$-$C_4$ alkyl;

m2 is 0, 1, or 2, preferably 0;

$R_3$ is hydrogen or —C($R_4$)=C($R_5$)H, wherein $R_4$ and $R_5$ are each independently hydrogen or a $C_1$-$C_{20}$ alkyl group, preferably having from 1 to 12 carbon atoms, from 1 to 8 carbon atoms, from 1 to 4 carbon atoms, or from 1 to 2 carbon atoms, including for example methyl;

A represents an alkylene group or a substituted alkylene group, having 2 to 4 carbon atoms, such as an ethylene, propylene, or butylene group, or combinations thereof; preferably, an ethylene group;

n represents an average addition mole number of alkylene oxide. n is an integer of 1 or more, 2 or more, 3 or more, 4 or more, or even 5 or more, and at the same time, 100 or less, 80 or less, 60 or less, 50 or less, 40 or less, 30 or less, or even 20 or less; preferably, from 2 to 20, and more preferably from 5 to 20; and X represents hydrogen, —$(CH_2)_a$—$SO_3M$, —$(CH_2)_b$—COOM, —$PO_3M_2$, —$P(Z)O_2M$, or —CO—$CH_2$—CH($SO_3M$)-COOM, wherein a and b are each independently an integer of from 0 to 4, Z represents a residual obtained by removing X from formula (I), and each M represents hydrogen, an alkali metal cation, an alkaline earth metal cation, $NH_4^+$, an aminium ion having an ethylenically unsaturated bond, an imidazolium ion having an ethylenically unsaturated bond, a pyridinium ion having an ethylenically unsaturated bond, a pyrrolidinium ion having an ethylenically unsaturated bond, or a piperidinium ion having an ethylenically unsaturated bond; preferably, X represents —$SO_3M$; more preferably, M is $NH_4^+$ or N,N-dimethyl-2-((3-methylbut-3-enoyl)oxy)ethan-1-aminium ion;

provided that only one of $R_3$ and X contains an ethylenically unsaturated bond, e.g., the polymerizable surfactant may contain only one ethylenically unsaturated bond. When the polymerizable surfactant of formula (I) contains more than one $R_1$ groups, such $R_1$ groups may be the same or different. When the polymerizable surfactant of formula (I) contains more than one $R_2$ groups, such $R_2$ groups may be the same or different.

In formula (I), each $R_1$ may be the same or different, and preferably is independently a phenyl substituted alkyl group such as

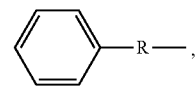

wherein R is an alkylene group having one to four carbon atoms, preferably having two to three carbon atoms, such as for example, —$CH_2$—, —$CH(CH_3)$—, or —$C(CH_3)_2$—. More preferably, $R_1$ is

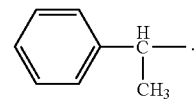

In formula (I), preferred m1 is from 1 to 3. More preferably, m1 is 3

In formula (I), preferred n is an integer ranging from 2 to 20, more preferably from 5 to 20.

In formula (I), preferred A is an ethylene group (—$CH_2CH_2$—). More preferably, A is —$CH_2CH_2$—, and n is an integer ranging from 2 to 20.

In some embodiments, the polymerizable surfactant has the structure of formula (I), wherein m1 is from 1 to 3, n is an integer ranging from 2 to 20, A is an ethylene group, and $R_1$ is

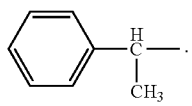

In some embodiments, the polymerizable surfactant has the structure of formula (I), wherein $R_3$ is —CH=CH(CH$_3$), and X is —SO$_3$M, wherein M is an alkali metal cation, an alkaline earth metal cation, or NH$_4^+$. Preferably, m2 in formula (I) is 0. More preferably, in formula (I), m1 is from 1 to 3 and $R_1$ is

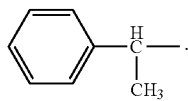

Specific examples of the polymerizable surfactant may include the following structure:

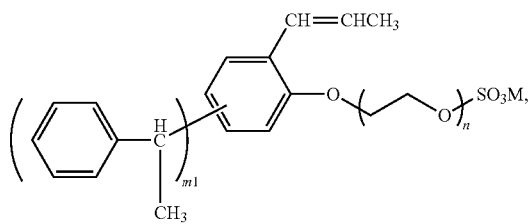

wherein m1 and n are as defined above, and M is Li$^+$, Na$^+$, K$^+$, or NH$_4^+$.

In some other embodiments, the polymerizable surfactant has the structure of formula (I), wherein $R_3$ is hydrogen, X is —(CH$_2$)$_a$—SO$_3$M, —(CH$_2$)$_b$—COOM, or —P(Z)O$_2$M, wherein a, b, and Z are as defined in formula (I), preferably —SO$_3$M; and M is

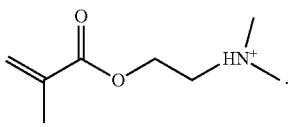

Preferably, m2 in formula (I) is zero. More preferably, in formula (I), m1 is from 1 to 3 and $R_1$ is

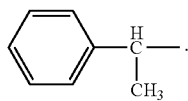

Specific examples of the polymerizable surfactant may include the following structure:

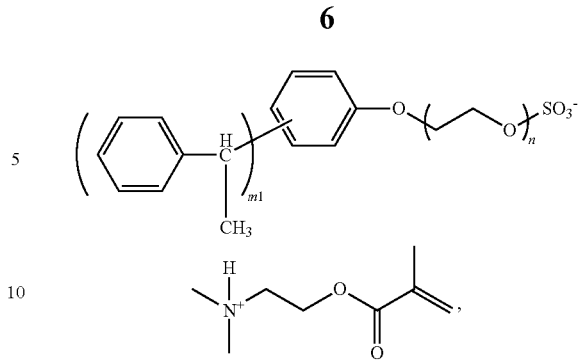

wherein m1 and n are as defined above.

Suitable commercially available polymerizable surfactants include HITENOL AR-1025 alkylphenol polyethoxylates (APEO) free ethoxylated styrenated phenol sulfate polymerizable surfactant available from Dai-Ichi Kogyo Seiyaku Co., Ltd., AMINOION RE-1000 polymerizable surfactant available from Nippon Nyukazai Co., Ltd., or mixtures thereof. The emulsion polymer useful in the present invention may comprise, by weight based on the dry weight of the emulsion polymer, 0.5% or more, 0.75% or more, 1.0% or more, 1.1% or more, 1.2% or more, 1.3% or more, or even 1.5% or more, and at the same time, 5% or less, 4.5% or less, 4% or less, 3.5% or less, 3% or less, 2.5% or less, or even 2% or less, of structural units of the polymerizable surfactant.

The emulsion polymer useful in the present invention may further comprise structural units of one or more ethylenically unsaturated monomers carrying at least one functional group selected from an amide, ureido, carboxyl, carboxylic anhydride, hydroxyl, sulfonic acid, sulfonate, phosphoric acid, or phosphate group; or salts thereof (hereinafter "functional-group-containing ethylenically unsaturated monomer").

Examples of suitable functional-group-containing ethylenically unsaturated monomers include α, β-ethylenically unsaturated carboxylic acids including an acid-bearing monomer such as methacrylic acid, acrylic acid, itaconic acid, maleic acid, or fumaric acid; or a monomer bearing an acid-forming group which yields or is subsequently convertible to, such an acid group such as anhydride, (meth)acrylic anhydride, or maleic anhydride; vinyl phosphonic acid; allyl phosphonic acid; phosphoalkyl (meth)acrylates such as phosphoethyl (meth)acrylate, phosphopropyl (meth)acrylate, phosphobutyl (meth)acrylate, or salts thereof; 2-acrylamido-2-methyl-1-propanesulfonic acid; sodium salt of 2-acrylamido-2-methyl-1-propane sulfonic acid; ammonium salt of 2-acrylamido-2-methyl-1-propane sulfonic acid; sodium styrene sulfonate; sodium vinyl sulfonate; sodium salt of allyl ether sulfonate; and the like; acrylamide, methacrylamide, monosubstituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide; methylacrylamidoethyl ethylene urea; hydroxy-functional (meth)acrylic acid alkyl ester such as hydroxyethyl methacrylate and hydroxypropyl methacrylate; or mixtures thereof. Preferred functional-group-containing ethylenically unsaturated monomers are selected from the group consisting of acrylic acid, methacrylic acid, phosphoethyl methacrylate, or mixtures thereof. The emulsion polymer may comprise, by weight based on the dry weight of the emulsion polymer, 0.3% or more, 0.5% or more, or even 1.0% or more, and at the same time, 10% or less, 5.0% or less, or even 3.0% or less, of structural units of the functional-group-containing ethylenically unsaturated monomer.

The emulsion polymer useful in the present invention may also comprise structural units of one or more $C_9$-$C_{30}$-alkyl esters of (meth)acrylic acid, i.e., $C_9$-$C_{30}$-alkyl (meth)acrylates containing alkyl moiety with from 9 to 30 carbon atoms. The $C_9$-$C_{30}$-alkyl esters of (meth)acrylic acid may contain alkyl moiety with from 9 to 25 carbon atoms, from 10 to 16 carbon atoms, or from 12 to 16 carbon atoms. Suitable $C_9$-$C_{30}$-alkyl esters of (meth)acrylic acid may include, for example, decyl acrylate, decyl methacrylate, isodecyl methacrylate, isodecyl acrylate, lauryl acrylate, lauryl methacrylate, icosyl acrylate, icosyl methacrylate, or mixtures thereof. The $C_9$-$C_{30}$-alkyl esters of (meth)acrylic acid can be a mixture of alkyl (meth)acrylates with alkyl groups having different carbon atoms. The emulsion polymer may comprise, by weight based on the dry weight of the emulsion polymer, less than 30% of structural units of the $C_9$-$C_{30}$-alkyl ester of (meth)acrylic acid, for example, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, or even 10% or more, and at the same time, 29% or less, 28% or less, 26% or less, 25% or less, 24% or less, 23% or less, 22% or less, 21% or less, 20% or less, 18% or less, 16% or less, or even 15% or less, of structural units of the $C_9$-$C_{30}$-alkyl ester of (meth)acrylic acid.

The emulsion polymer useful in the present invention may further comprise structural units of one or more additional ethylenically unsaturated nonionic monomers that are different from the monomers described above. As used herein, the term "nonionic monomers" refers to monomers that do not bear an ionic charge between pH=1-14. Suitable additional ethylenically unsaturated nonionic monomers may include vinyl aromatic monomers, $C_1$-$C_8$-alkyl esters of (meth)acrylic acids, (meth)acrylonitrile, acetoacetoxyethyl methacrylate (AAEM), diacetone acrylamide (DAAM), cycloalkyl (meth)acrylates such as cyclohexyl methacrylate and cyclohexyl acrylate, glycidyl (meth)acrylate, ethylenically unsaturated monomers carrying at least one alkoxysilane functionality including vinyltrialkoxysilanes such as vinyltrimethoxysilane, vinyltriethoxysilane, and vinyltris(2-methoxyethoxy)silane, vinyldimethylethoxysilane, vinylmethyldiethoxysilane, (meth)acryloxyalkyltrialkoxysilanes such as (meth)acryloxyethyltrimethoxysilane and (meth)acryloxypropyltrimethoxysilane, or mixtures thereof. Suitable vinyl aromatic monomers may include, for example, styrene, substituted styrene such as methylstyrene, alpha-methylstyrene, trans-beta-methylstyrene, 2,4-dimethylstyrene, ethylstyrene, butylstyrene, and p-methoxystyrene; o-, m-, and p-methoxystyrene, and p-trifluoromethylstyrene, or mixtures thereof. Suitable $C_1$-$C_8$-alkyl esters of (meth)acrylic acid include, for example, methyl acrylate, ethyl acrylate, 2-ethylhexyl acrylate, methyl methacrylate, butyl acrylate, butyl methacrylate, tert-butyl acrylate, tert-butyl methacrylate, iso-butyl acrylate, iso-butyl methacrylate, or mixtures thereof. Preferably, the additional ethylenically unsaturated nonionic monomers are selected from the group consisting of methyl methacrylate, ethyl acrylate, butyl acrylate, 2-ethylhexyl acrylate, styrene, or mixtures thereof. The emulsion polymer may comprise, by weight based on the dry weight of the emulsion polymer, from 65% to 95%, from 67% to 93.5%, from 70% to 92%, or from 75% to 90%, of structural units of the additional ethylenically unsaturated nonionic monomer.

The emulsion polymer useful in the present invention may optionally comprise structural units of one or more multiethylenically unsaturated monomers including di-, tri-, tetra-, or higher multifunctional ethylenically unsaturated monomers. Suitable multiethylenically unsaturated monomers may include, for example, butadiene, allyl (meth)acrylate, diallyl phthalate, divinyl benzene, ethylene glycol dimethacrylate, butylene glycol dimethacrylate, or mixtures thereof. The emulsion polymer may comprise, by weight based on the dry weight of the emulsion polymer, from zero to 5%, from 0.05% to 1%, or from 0.1% to 0.5%, of structural units of the multiethylenically unsaturated monomer.

In some embodiments, the emulsion polymer comprises, by weight based on the dry weight of the emulsion polymer,
from 0.5% to 3% of structural units of the polymerizable surfactant,
from 1% to 5% of structural units of the ethylenically unsaturated monomer carrying at least one functional group or the salt thereof;
from 5% to 25% of structural units of the $C_9$-$C_{30}$-alkyl ester of (meth)acrylic acid such as lauryl methacrylate, lauryl acrylate, icosyl methacrylate, or mixtures thereof,
from 67% to 93.5% of structural units of the additional ethylenically unsaturated nonionic monomer.

The types and levels of the monomers described above may be chosen to provide the emulsion polymer with a glass transition temperature (Tg) suitable for different applications. The emulsion polymer may have a calculated Tg of $-45°$ C. or higher, $-40°$ C. or higher, $-35°$ C. or higher, $-30°$ C. or higher, $-25°$ C. or higher, $-20°$ C. or higher, and at the same time, $30°$ C. or lower, $25°$ C. or lower, $20°$ C. or lower, $15°$ C. or lower, $10°$ C. or lower, $5°$ C. or lower, $0°$ C. or lower, $-5°$ C. or lower, or even $-10°$ C. or lower, as determined by the Fox equation above.

The emulsion polymer useful in the present invention may be prepared by emulsion polymerization of a mixture of monomers comprising the polymerizable surfactant and other monomers described above. Total weight concentration of the polymerizable surfactant and other monomers described above for preparing the emulsion polymer is equal to 100%. The mixture of monomers, may be added neat or as an emulsion in water; or added in one or more additions or continuously, linearly or nonlinearly, over the reaction period of preparing the emulsion polymer. Temperature suitable for emulsion polymerization process may be lower than $100°$ C., in the range of from 30 to $95°$ C., or in the range of from 50 to $90°$ C.

In the polymerization process of preparing the emulsion polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the emulsion polymer, one or more additional surfactants may be used. The additional surfactants are different from the polymerizable surfactant described above. The polymerizable surfactant and/or the additional surfactant may be added prior to or during the polymerization of the monomers, or combinations thereof. A portion of the additional surfactant can also be added after the polymerization. These additional surfactants may include anionic and/or nonionic emulsifiers. Examples of suitable additional surfactants include RHODAFAC RS-610 alkyl ethoxylated phosphate available from Solvay S. A., DISPONIL FES 32 fatty alcohol ether sulfate available from BASF, TERGITOL™ 15-S-40 secondary alcohol ethoxylate available from Dow Chemical Company (TERGITOL is a trademark of The Dow Chemical Company). The additional surfactant may be present in an amount of from zero to 3%, from 0.5% to 2.5%, or from 0.7% to 1.5%, by weight based on the weight of the monomer mixture used for preparing the emulsion polymer.

In the polymerization process of preparing the emulsion polymer, a chain transfer agent may be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the emulsion polymer, for example, in an amount of from zero to 1%, from 0.1% to 0.5%, or from 0.15% to 0.4%, by weight based on the weight of the monomer mixture used for preparing the emulsion polymer.

After completing the polymerization of the emulsion polymer, the obtained emulsion polymer may be neutralized by one or more bases as neutralizers to a pH value, for example, at least 6, from 6 to 10, or from 7 to 9. The bases may lead to partial or complete neutralization of the ionic or latently ionic groups of the emulsion polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The emulsion polymer useful in the present invention may have a particle size of from 50 nanometers (nm) to 500 nm, from 80 nm to 200 nm, or from 90 nm to 150 nm. The particle size herein refers to Z-average size and may be measured by a Brookhaven BI-90 Plus Particle Size Analyzer.

The aqueous dispersion of the present invention may further comprise one or more wax. The wax can be polyethylene (PE) wax such as high density polyethylene (HDPE) wax, polypropylene (PP) wax, carnauba wax, paraffin wax, polyethylene acrylic acid wax, or mixtures thereof. Wax can be added to the aqueous dispersion as a wax emulsion, or added by dissolving into the monomers used for preparing the emulsion polymer as U.S. Pat. No. 4,368,077 or added by blending with the emulsion polymer. The wax emulsion may have an average particle size of from 10 to 1,000 nm, 30 to 500 nm, from 50 to 200 nm, or from 100 to 200 nm, as measured by a Brookhaven BI-90 or 90Plus Particle Sizer. Commercially available wax emulsions may include, for example, MICHEM ME 62330 paraffin/PE wax emulsion, MICHEM ME 34935 paraffin/ethylene acrylic acid wax emulsion, MICHEM 180 blend of paraffin and carnauba wax, and MICHEM ME 71450 paraffin wax emulsion all available from Michelman Inc.; ULTRALUBE E-340 paraffin wax emulsion and ULTRALUBE E-668 H PP wax emulsion both available from Keim-Additec; or mixtures thereof.

In some embodiments, a paraffin wax emulsion is used. Preferably, the paraffin wax is a melted refined paraffin wax, or its blend with other materials. The paraffin wax typically has a melting temperature of 46° C. to 71° C. Solids of the paraffin wax emulsion can vary from 1% to 60% by weight or from 30% to 55% by weight. The pH of the wax emulsion can range from 6 to 10, typically 7.9 to 9.8, but is dependent on the process used. The paraffin wax emulsion can be prepared by melting refined paraffin wax to a temperature above the melting point of the paraffin. Appropriate emulsifiers, such as stearic acid, oleic acid, diethylamine ethanol, 2-amino-2-methyl-1-propanol, can then be added into the molten wax and water mixture with agitation at elevated temperatures. A base, such as potassium hydroxide or ammonium hydroxide, can then be dissolved in ethylene glycol or water at elevated temperatures and slowly added to the resultant mixture while increasing the speed of agitation. After all the water/base mixture has been added to the molten wax, the resulting wax in water emulsion can be passed through a homogenizer to further adjust particle size of the wax emulsion. After homogenization, the resulting wax emulsion is cooled, for example, through a heat exchanger, and then filtered and packaged.

The aqueous dispersion of the present invention may comprise, by solids weight based on the dry weight of the emulsion polymer, more than 1% of the wax, for example, 1.1% or more, 1.2% or more, 1.5% or more, 1.6% or more, 1.7% or more, 1.8% or more, 1.9% or more, 2% or more, 2.5% or more, 3% or more, 3.5% or more, or even 4% or more, and at the same time, 20% or less, 18% or less, 15% or less, 12% or less, 10% or less, 9% or less, 8% or less, 7% or less, 6% or less, 5.5% or less, 5% or less, or even 4.5% or less, of the wax. The aqueous dispersion may be prepared admixing the wax with the emulsion polymer.

The present invention also relates to an aqueous coating composition comprising the aqueous dispersion of the present invention. The aqueous coating composition may also comprise one or more pigments. As used herein, the term "pigment" refers to a particulate inorganic material which is capable of materially contributing to the opacity or hiding capability of a coating. Such materials typically have a refractive index greater than 1.8 and include inorganic pigments and organic pigments. Examples of suitable inorganic pigments include titanium dioxide ($TiO_2$), zinc oxide, zinc sulfide, iron oxide, barium sulfate, barium carbonate, or mixtures thereof. Preferred pigment used in the present invention is $TiO_2$. $TiO_2$ may be also available in concentrated dispersion form. The aqueous coating composition of the present invention may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition of the present invention may have a pigment volume concentration (PVC) of zero or more, 5% or more, 10% or more, 15% or more, 20% or more, 25% or more, 30% or more, or even 40% or more, and at the same time, 55% or less, 50% or less, 45% or less, or even 40% or less. PVC of a coating composition may be determined according to the following equation:

$$PVC = \frac{\text{volume of pigment}(s) + \text{volume of extender}(s)}{\text{total dry volume of coating composition}} \times 100\%$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The defoamer may be present, by weight based on the total weight of the aqueous coating composition, in an amount of from zero to 0.5%, from 0.05% to 0.4%, or from 0.1% to 0.3%.

The aqueous coating composition of the present invention may further comprise one or more thickeners, also known as "rheology modifiers". The thickeners may include polyvinyl alcohol (PVA), acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is selected from HASE, HEC, HEUR, or mixtures thereof. The thickener may be present, by weight based on the total weight of the aqueous coating composition, in an amount of from zero to 3.0%, from 0.1% to 1.5%, or from 0.2% to 1.2%.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, TRITON™ CF-10 nonionic surfactant available from The Dow Chemical Company (TRITON is a trademark of The Dow Chemical Company), SURFYNOL 10 nonionic wetting agent based on an actacetylenic diol available from Air Products, BYK-346 and BYK-349 polyether-modified siloxanes both available from BYK, or mixtures thereof. The wetting agent may be present, by weight based on the total weight of the aqueous coating composition, in an amount of from zero to 1.0%, from 0.1% to 0.8%, or from 0.2% to 0.6%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include TEXANOL ester alcohol available from Eastman Chemical Company, Coasol and Coasol 290 Plus coalescents available from Chemoxy International Ltd., dipropylene glycol n-butyl ether, ethylene glycol monobutyl ether, diethylene glycol monobutyl ether, n-butyl ether, or mixtures thereof. The coalescent may be present, by weight based on the total weight of the aqueous coating composition, in an amount of from zero to 3.0%, from 0.1% to 2.0%, or from 0.2% to 1.5%.

The aqueous coating composition of the present invention may further comprise one or more dispersants. The dispersants may include non-ionic, anionic or cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other comonomers; salts thereof; or mixtures thereof. The molecular weight of such polyacids may be in the range of from 1,000 to 50,000, from 1,200 to 40,000, from 1,500 to 20,000, from 2,000 to 15,000, or from 2,500 to 10,000, as measured by Gel Permeation Chromatography (GPC) (column: One PLgel GUARD columns (10 µm, 50×7.5 mm) and One Mixed B columns (7.8×300 mm) in tandem; and calibration: PL Polystyrene Narrow standards with molecular weights ranging from 2329000 to 580 g/mol, using polynom 3 fitness). The dispersant may be present, by weight based on the total weight of the aqueous coating composition, in an amount of from zero to 3.0%, from 0.1% to 1.0%, or from 0.2% to 0.6%.

In addition to the components described above, the aqueous coating composition of the present invention may further comprise any one or combination of the following additives: buffers, neutralizers, humectants, mildewcides, biocides, anti-skinning agents, colorants, flowing agents, anti-freezing agents, anti-oxidants, plasticizers, leveling agents, thixotropic agents, adhesion promoters, and grind vehicles. When present, these additives may be present in a combined amount of from zero to 1% or from 0.1% to 0.8%, by weight based on the total weight of the aqueous coating composition.

The aqueous coating composition of the present invention may further comprise water. The concentration of water may be, by weight based on the total weight of the coating composition, from 30% to 90%, from 40% to 80%, or from 50% to 70%.

The aqueous coating composition of the present invention may be prepared by admixing the emulsion polymer, the wax, and optionally, the pigment and other components described above. Components in the aqueous coating composition may be mixed in any order to provide the aqueous coating composition of the present invention. Any of the above-mentioned optional components may also be added to the composition during or prior to the mixing to form the aqueous coating composition. The pigments and/or extenders are preferably mixed with the dispersant to form a slurry of pigments and/or extender.

The aqueous coating composition of the present invention can provide a coating obtained therefrom with improved durable liquid stain repellency, while showing good early water repellency as indicated by beading score higher than 3 (>3) after 2-hour or 24-hour drying, as measured according to the test method described in Examples section below. "Improved durable liquid stain repellency" or "good durable liquid stain repellency" used in the present invention refers to a coating or a coated substrate that achieves both good durable water repellency and good durable ink repellency as indicated by beading scores higher than 3 (>3), as measured according to the test methods described in Examples section below.

The present invention also relates to a method of producing a coating on a substrate, comprising: applying the substrate the aqueous coating composition of the present invention, and drying, or allowing to dry the aqueous coating composition to form the coating with improved durable liquid stain repellency as described above. Drying, or allowing to dry, the applied aqueous coating composition forms a coating. The aqueous coating composition can be applied to, and adhered to, various substrates. Examples of suitable substrates include wood, metals, plastics, foams, stones, elastomeric substrates, glass, wall paper, fabrics, medium-density fiberboard (MDF), particle boards, gypsum boards, concrete, or cementious substrates. The aqueous coating composition can be applied to the substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition has been applied to a substrate, the coating composition can dry, or allow to dry, to form a film (this is, coating) at room temperature (20-25° C.), or at an elevated temperature, for example, from 35° C. to 60° C. The coating composition can be used alone, or in combination with other coatings to form multi-layer coatings.

The aqueous coating composition of the present invention are useful as coatings on various substrates, where both good durable water repellency and good durable ink repellency are important. The aqueous coating composition is suitable for various applications such as interior coatings, marine and protective coatings, automotive coatings, traffic paints, Exterior Insulation and Finish Systems (EIFS), roof mastic, wood coatings, coil coatings, plastic coatings, can coatings, architectural coatings, and civil engineering coatings. The aqueous coating composition is particularly useful for interior coatings.

EXAMPLES

Some embodiments of the invention will now be described in the following Examples, wherein all parts and percentages are by weight unless otherwise specified. Monomers, materials, and their abbreviations are as follows, Styrene (ST), 2-Ethylhexyl acrylate (2-EHA), hydroxyethyl methacrylate phosphate (PEM), methyl methacrylate (MMA), butyl acrylate (BA), methacrylic acid (MAA), and lauryl methacrylate (LMA).

HITENOL AR-1025 surfactant (25% active) (AR-1025), available from Dai-Ichi Kogyo Seiyaku Co., Ltd., is polyoxyethylene styrenated propenyl phenyl ether sulfate ammonium salt.

RHODACAL DS-4 surfactant (22% active) (DS-4), available from Rhodia (China) Investment Co., Ltd., is sodium dodecyl (branched) benzene sulfonate.

ADEKA REASOAP SR-1025 reactive surfactant (25% active) (SR-1025), available from ADEKA (Shanghai) Co., Ltd., is an anionic polymerizable emulsifier, poly(oxy-1,2-ethanediyl), alpha-sulfo-omega-1-(hydroxymethyl)-2-(2-propenyloxy)ethoxy]-, alkyl ethers ammonium salts.

AMINOION RE-1000 surfactant (30% active) (RE-1000), available from Nippon Nyukazai Co., Ltd., comprises poly(oxy-1,2-ethanediyl), alpha.-sulfo-omega-(methylphenoxy)-ar-styrenated,2-Propenoic acid, 2-methyl-2-(dimethylamino)ethyl ester salts.

ULTRALUBE E-340 wax emulsion (E-340), available from Keim-Additec Company, is a paraffin wax emulsion with a solids content of 50%.

The following standard analytical equipment and methods are used in the Examples.

Early Water Repellency Test

A coating composition was casted on black/white Leneta charts (Form 2A Opacity) using a 100 μm film caster and dried at 25° C. for 2 hours and 24 hours, respectively. The coated charts were kept vertical so that water drops were allowed to flow from the upper to the bottom side of the chart. Then the early water repellency properties were visually rated and represented by beading scores as shown in Table 1 below. The beading scores for 2-hour drying and 24-hour drying both higher than 3 (>3) indicate good early water repellency. Otherwise, if the beading score for 2-hour drying or 24-hour drying is 3 or lower, it indicates poor early water repellency.

Durable Liquid Stain Repellency Test

Durable liquid stain repellency represents difficulty for liquid stain (e.g., water or ink) to wet the coating surface after wet brushing. A coating composition was casted on a Leneta black scrub test panel (P121-10N) by using a 175 μm film caster, starting from the secured end of the panel. The panel was then air dried horizontally at 25° C. for 7 days in a Constant Temperature Room (CTR). A brush was soaked in soap water (a 0.5% laundry detergent aqueous solution used as the scrub medium) overnight before use, and then was mounted in a holder with the brush's bristle-side down to start the test. After wet brushing for 100 times, the panel was then dried overnight and used for testing durable water repellency and durable ink repellency, respectively.

Durable water repellency test: The above obtained panel was kept vertical so that water drops were allowed to flow from the upper to the bottom side of the panel. Durable water repellency was visually observed and ranked by beading scores as shown in Table 1 below. The beading score higher than 3 (>3) after the durable water repellency test indicates good durable water repellency. Otherwise, if the beading score is 3 or lower, it indicates poor durable water repellency.

Durable ink repellency test: The above obtained panel was kept vertical so that drops of an aqueous ink solution (50%) were allowed to flow from the upper to the bottom side of the panel. Durable ink repellency was visually observed and ranked by beading scores as shown in Table 1 below. The beading score higher than 3 (>3) after the durable ink repellency test indicates good durable ink repellency. Otherwise, if the beading score is 3 or lower, it indicates poor durable ink repellency.

TABLE 1

Ranking standard for water or ink repellency

| Beading Score | Description |
| --- | --- |
| 5 | No wetting nor adhesion of water droplets observed on the coating surface |
| 4 | Wetting observed by individual small circular or elliptic water droplets observed on the coating surface |
| 3 | Wetting observed by individual large water droplets on the coating surface |
| 2 | Wetting observed along the discrete track of water on the coating surface |
| 1 | Wetting observed along the thinner track of water on the coating surface |
| 0 | Wetting observed along the entire track of water on the coating surface |

Comparative (Comp) Example (Ex) A Binder

A monomer emulsion (ME) was prepared by mixing de-ionized (DI) water (400 g), AR-1025 (89 g), ST (860 g), 2-EHA (676.2 g), and PEM (44.4 g). A 5-liter, four necked round bottom flask equipped with a paddle stirrer, a thermometer, a nitrogen inlet and a reflux condenser was charged with DI water (800 g). The content of the flask was heated to 90° C. under nitrogen atmosphere with stirring. Then, AR-1025 (12.5 g), Na$_2$CO$_3$ (5.0 g), and ME (98 g), quickly followed by sodium persulfate (SPS) (5.5 g), were added to the flask. Upon holding the batch for 1 minute with stirring, the remaining ME was added into the flask while co-feeding a catalyst solution of SPS (2.12 g SPS dissolved in 50 g DI water and an activator solution of sodium bisulfite (2.30 g sodium bisulfite dissolved in 50 g DI water) in 120 minutes. When the ME feed was completed, tert-Butyl hydroperoxide (3 g) and iso-ascorbic acid (1.6 g) were added to the flask in 40 minutes to chase the residual monomers separately. Then, an ammonia solution (35%, 28 g) was added to adjust the pH to 8.0-8.5. At last, E-340 wax emulsion (196.7 g) was post added slowly. The resultant dispersion had a measured particle size of about 120 nm and a solids content of about 47.50%.

Ex 1 Binder

A monomer emulsion (ME) was prepared by mixing DI water (400 g), AR-1025 (89 g), ST (771.4 g), 2-EHA (606.3 g), LMA (159 g), and PEM (44.4 g). A 5-liter, four necked round bottom flask equipped with a paddle stirrer, a thermometer, a nitrogen inlet and a reflux condenser was charged with DI water (800 g). The content of the flask was heated to 90° C. under nitrogen atmosphere with stirring. Then, AR-1025 (12.5 g), Na$_2$CO$_3$ (5.0 g), and ME (98 g), quickly followed by SPS (5.5 g), were added to the flask. Upon holding the batch for 1 minute with stirring, the remaining ME was added into the flask while co-feeding a catalyst solution of SPS (2.12 g SPS dissolved in 50 g DI water) and an activator solution of sodium bisulfite (2.30 g sodium bisulfite dissolved in 50 g DI water) in 120 minutes. When the ME feed was completed, tert-Butyl hydroperoxide (3 g) and iso-ascorbic acid (1.6 g) were added to the flask in 40 minutes to chase the residual monomers separately. Then, an ammonia solution (35%, 28 g) was added to adjust the pH to 8.0-8.5. At last, E-340 wax emulsion (196.7 g) was post added slowly. The resultant dispersion had a measured particle size of about 120 nm and a solids content of about 47.50%.

Ex 2 Binder

A monomer emulsion (ME) was prepared by mixing DI water (400 g), AR-1025 (89 g), ST (788 g), 2-EHA (606.3 g), LMA (159 g), and MAA (32 g). A 5-liter, four necked round bottom flask equipped with a paddle stirrer, a thermometer, a nitrogen inlet and a reflux condenser was charged with DI water (800 g). The content of the flask was heated to 90° C. under nitrogen atmosphere with stirring. Then, AR-1025 (12.5 g), Na$_2$CO$_3$ (5.0 g), and ME (98 g), quickly followed by SPS (5.5 g), were added to the flask. Upon holding the batch for 1 minute with stirring, the remaining ME was added into the flask while co-feeding a catalyst solution of SPS (2.12 g SPS dissolved in 50 g DI water) and an activator solution of sodium bisulfite (2.30 g sodium bisulfite dissolved in 50 g DI water) in 120 minutes. When the ME feed was completed, tert-Butyl hydroperoxide (3 g) and iso-ascorbic acid (1.6 g) were added to the flask in 40 minutes to chase the residual monomers separately. Then, an ammonia solution (35%, 28 g) was added to adjust the pH to 8.0-8.5. At last, E-340 wax emulsion (196.7 g) was post added slowly. The resultant dispersion had a measured particle size of about 120 nm and a solids content of about 47.50%.

Comp Ex B Binder

A monomer emulsion (ME) was prepared by mixing DI water (400 g), AR-1025 (89 g), ST (869 g), 2-EHA (684.4 g), and MAA (32 g). A 5-liter, four necked round bottom flask equipped with a paddle stirrer, a thermometer, a nitrogen inlet and a reflux condenser was charged with DI water (800 g). The content of the flask was heated to 90° C. under nitrogen atmosphere with stirring. Then, AR-1025 (12.5 g), Na$_2$CO$_3$ (5.0 g), and ME (98 g), quickly followed by SPS (5.5 g), were added to the flask. Upon holding the batch for 1 minute with stirring, the remaining ME was added into the flask while co-feeding a catalyst solution of SPS (2.12 g SPS dissolved in 50 g DI water) and an activator solution of sodium bisulfite (2.30 g dissolved in 50 g DI water) in 120 minutes. When the ME feed was completed, tert-Butyl hydroperoxide (3 g) and iso-ascorbic acid (1.6 g) were added to the flask in 40 minutes to chase the residual monomers separately. Then, an ammonia solution (35%, 28 g) was added to adjust the pH to 8.0-8.5. At last, E-340 wax emulsion (196.7 g) was post added slowly. The resultant dispersion had a measured particle size of about 120 nm and a solids content of about 47.50%.

Ex 3 Binder

A monomer emulsion (ME) was prepared by mixing DI water (400 g), AR-1025 (89 g), ST (771.4 g), 2-EHA (446.9 g), LMA (318 g), and PEM (44.4 g). A 5-liter, four necked round bottom flask equipped with a paddle stirrer, a thermometer, a nitrogen inlet and a reflux condenser was charged with DI water (800 g). The content of the flask was heated to 90° C. under nitrogen atmosphere with stirring. Then, AR-1025 (12.5 g), Na$_2$CO$_3$ (5.0 g), and ME (98 g), quickly followed by SPS (5.5 g), were added to the flask. Upon holding the batch for 1 minute with stirring, the remaining ME was added into the flask while co-feeding a catalyst solution of SPS (2.12 g SPS dissolved in 50 g DI water) and an activator solution of sodium bisulfite (2.30 g sodium bisulfite dissolved in 50 g DI water) in 120 minutes. When the ME feed was completed, tert-Butyl hydroperoxide (3 g) and iso-ascorbic acid (1.6 g) were added to the flask in 40 minutes to chase the residual monomers separately. Then, an ammonia solution (35%, 28 g) was added to adjust the pH to 8.0-8.5. At last, E-340 wax emulsion (196.7 g) was post added slowly. The resultant dispersion had a measured particle size of about 120 nm and a solids content of about 47.50%.

Comp Ex C Binder

A monomer emulsion (ME) was prepared by mixing DI water (400 g), AR-1025 (89 g), ST (771.4 g), 2-EHA (287.3 g), LMA (476.5 g), and PEM (44.4 g). A 5-liter, four necked round bottom flask equipped with a paddle stirrer, a thermometer, a nitrogen inlet and a reflux condenser was charged with DI water (800 g). The content of the flask was heated to 90° C. under nitrogen atmosphere with stirring. Then, AR-1025 (12.5 g), Na$_2$CO$_3$ (5.0 g), and ME (98 g), quickly followed by SPS (5.5 g), were added to the flask. Upon holding the batch for 1 minute with stirring, the remaining ME was added into the flask while co-feeding a catalyst solution of SPS (2.12 g SPS dissolved in 50 g DI water) and an activator solution of sodium bisulfite (2.30 g sodium bisulfite dissolved in 50 g DI water) in 120 minutes. When the ME feed was completed, tert-Butyl hydroperoxide (3 g) and iso-ascorbic acid (1.6 g) were added to the flask in 40 minutes to chase the residual monomers separately. Then, an ammonia solution (35%, 28 g) was added to adjust the pH to 8.0-8.5. At last, E-340 wax emulsion (196.7 g) was post added slowly. The resultant dispersion had a measured particle size of about 120 nm and a solids content of about 47.50%.

Ex 4 Binder

A monomer emulsion (ME) was prepared by mixing DI water (400 g), AR-1025 (89 g), MMA (788 g), 2-EHA (606.3 g), LMA (159 g), and MAA (32 g). A 5-liter, four necked round bottom flask equipped with a paddle stirrer, a thermometer, a nitrogen inlet and a reflux condenser was charged with DI water (800 g). The content of the flask was heated to 90° C. under nitrogen atmosphere with stirring. Then, AR-1025 (12.5 g), Na$_2$CO$_3$ (5.0 g), and ME (98 g), quickly followed by SPS (5.5 g), were added to the flask. Upon holding the batch for 1 minute with stirring, the remaining ME was added into the flask while co-feeding a catalyst solution of SPS (2.12 g SPS dissolved in 50 g DI water) and an activator solution of sodium bisulfite (2.30 g sodium bisulfite dissolved in 50 g DI water) in 120 minutes. When the ME feed was completed, tert-Butyl hydroperoxide (3 g) and iso-ascorbic acid (1.6 g) were added to the flask in 40 minutes to chase the residual monomers separately. Then, an ammonia solution (35%, 28 g) was added to adjust the pH to 8.0-8.5. At last, E-340 wax emulsion (196.7 g) was post added slowly. The resultant dispersion had a measured particle size of about 120 nm and a solids content of about 47.50%.

Comp Ex D Binder

A monomer emulsion (ME) was prepared by mixing DI water (400 g), SR-1025 (89 g), ST (788 g), 2-EHA (606.3 g), LMA (159 g), and MAA (32 g). A 5-liter, four necked round bottom flask equipped with a paddle stirrer, a thermometer, a nitrogen inlet and a reflux condenser was charged with DI water (800 g). The content of the flask was heated to 90° C. under nitrogen atmosphere with stirring. Then, SR-1025 (12.5 g), Na$_2$CO$_3$ (5.0 g), and ME (98 g), quickly followed by SPS (5.5 g), were added to the flask. Upon holding the batch for 1 minute with stirring, the remaining ME was added into the flask while co-feeding a catalyst solution of SPS (2.12 g SPS dissolved in 50 g DI water) and an activation solution of sodium bisulfite (2.30 g sodium bisulfite dissolved in 50 g DI water) in 120 minutes. When the ME feed was complete, tert-Butyl hydroperoxide (3 g) and iso-ascorbic acid (1.6 g) were added to the flask in 40 minutes to chase the residual monomers separately. Then, an ammonia solution (35%, 28 g) was added to adjust the pH to 8.0-8.5. At last, E-340 wax emulsion (196.7 g) was post added slowly. The resultant dispersion had a measured particle size of about 120 nm and a solids content of about 47.50%.

Comp Ex E Binder

A monomer emulsion (ME) was prepared by mixing DI water (400 g), DS-4 (93.5 g), ST (788 g), 2-EHA (606.3 g), LMA (159 g), and MAA (32 g). A 5-liter, four necked round bottom flask equipped with a paddle stirrer, a thermometer, a nitrogen inlet and a reflux condenser was charged with DI water (800 g). The content of the flask was heated to 90° C. under nitrogen atmosphere with stirring. Then, DS-4 (13.2 g), Na$_2$CO$_3$ (5.0 g), and ME (98 g), quickly followed by SPS (5.5 g), were added to the flask. Upon holding the batch for 1 minute with stirring, the remaining ME was added into the flask while co-feeding a catalyst solution of SPS (2.12 g SPS dissolved in 50 g DI water) and an activator solution of sodium bisulfite (2.30 g sodium bisulfite dissolved in 50 g DI water) in 120 minutes. When the ME feed was completed, tert-Butyl hydroperoxide (3 g) and iso-ascorbic acid (1.6 g) were added to the flask in 40 minutes to chase the residual monomers separately. Then, an ammonia solution (35%, 28 g) was added to adjust the pH to 8.0-8.5. At last, E-340 wax emulsion (196.7 g) was post added slowly. The resultant dispersion had a measured particle size of about 120 nm and a solids content of about 47.50%.

Ex 5 Binder

A monomer emulsion (ME) was prepared by mixing DI water (400 g), RE-1000 (74.17 g), ST (788 g), 2-EHA (606.3 g), LMA (159 g), and MAA (32 g). A 5-liter, four necked round bottom flask equipped with a paddle stirrer, a thermometer, a nitrogen inlet and a reflux condenser was charged with DI water (800 g). The content of the flask was heated to 90° C. under nitrogen atmosphere with stirring. Then, RE-1000 (–10.42 g), Na$_2$CO$_3$ (5.0 g), and ME (98 g), quickly followed by SPS (5.5 g), were added to the flask. Upon holding the batch for 1 minute with stirring, the remaining ME was added into the flask while co-feeding a catalyst solution of SPS (2.12 g SPS dissolved in 50 g DI water) and an activator solution of sodium bisulfite (2.30 g sodium bisulfite dissolved in 50 g DI water) in 120 minutes. When the ME feed was completed, tert-Butyl hydroperoxide (3 g) and iso-ascorbic acid (1.6 g) were added to the flask in 40 minutes to chase the residual monomers separately. Then, an ammonia solution (35%, 28 g) was added to adjust the pH to 8.0-8.5. At last, E-340 wax emulsion (196.7 g) was post added slowly. The resultant dispersion had a measured particle size of about 120 nm and a solids content of about 47.50%.

Comp Ex F Binder

A monomer emulsion (ME) was prepared by mixing DI water (400 g), AR-1025 (89 g), ST (399 g), 2-EHA (606.3 g), LMA (159 g), BA (387.5 g), and MAA (32 g). A 5-liter, four necked round bottom flask equipped with a paddle stirrer, a thermometer, a nitrogen inlet and a reflux condenser was charged with DI water (800 g). The content of the flask was heated to 90° C. under nitrogen atmosphere with stirring. Then, AR-1025 (12.5 g), $Na_2CO_3$ (5.0 g), and ME (98 g), quickly followed by SPS (5.5 g), were added to the flask. Upon holding the batch for 1 minute with stirring, the remaining ME was added into the flask while co-feeding a catalyst solution of SPS (2.12 g SPS dissolved in 50 g DI water) and an activator solution of sodium bisulfite (2.30 g sodium bisulfite dissolved in 50 g DI water) in 120 minutes. When the ME feed was completed, tert-Butyl hydroperoxide (3 g) and iso-ascorbic acid (1.6 g) were added to the flask in 40 minutes to chase the residual monomers separately. Then, an ammonia solution (35%, 28 g) was added to adjust the pH to 8.0-8.5. At last, E-340 wax emulsion (196.7 g) was post added slowly. The resultant dispersion had a measured particle size of about 120 nm and a solids content of about 47.50%.

Comp Ex G and Exs 6-7 Binders

Comp Ex G and Exs 6-7 binders were prepared according to the same procedure as Ex 2 binder above, except that the amount of E-340 wax emulsion added was different: 32.78 g E-340 wax emulsion was added when preparing Comp Ex G binder, 131.13 g E-340 wax emulsion was used when preparing Ex 6 binder, and 655.7 g E-340 wax emulsion was used when preparing Ex 7 binder. Thus, the Comp Ex G, Ex 6 and Ex 7 binders contained 1% wax, 4% wax, and 20% wax, respectively, by solids weight based on the dry weight of the emulsion polymer in the binder. The resultant dispersions all had a measured particle size of about 120 nm and a solids content of about 47.50%.

The above obtained aqueous dispersions were used as binders in preparing coating compositions below.

Coating Compositions

Coating compositions (Coating Ex 1-1 through Coating Ex 7, and Coating Comp Ex A-1 through Coating Comp Ex G) were prepared based on formulations listed in Table 2. Ingredients for grind were mixed using a high speed Cowles disperser at a speed of 800-1000 revolutions per minute (rpm). Then ingredients for the letdown stage were added and mixed by a conventional agitator at a speed of 500-800 rpm. The binder prepared above and the neutralizer used for preparing each coating composition (AMP-95 neutralizer from Angus Company or 15% LiOH base from Sinopharm Chemical Reagent Co., Ltd.) are given in Table 3.

TABLE 2

Typical Coating Compositions

| Material | Supplier | Dosage (gram) |
| --- | --- | --- |
| Grind | | |
| Water | | 200.0 |
| NATROSOL ™ 250 HBR thickener | Ashland Company | 4.0 |
| OROTAN ™ 2500 dispersant | The Dow Chemical Company | 14.8 |
| Neutralizer | | 1.5 |
| TERGITOL ™ 15-S-40 surfactant | The Dow Chemical Company | 2.0 |
| NOPCO ™ NXZ defoamer | Nopco Chemicals Co. Ltd. | 2.0 |
| DB-80 calcined clay | Guangfu Building Materials Group | 50.0 |
| CC-700 calcium carbonate | Guangfu Building Materials Group | 50.0 |
| TI-PUTE ™ R-706 titanium dioxide | DuPont Company | 200.0 |
| LetDown | | |
| Binder | | 366.4 |
| TEXANOL ™ coalescent | Eastman Chemical Company | 18.5 |
| ROPAQUE ™ Ultra E | The Dow Chemical Company | 40.0 |
| Water | | 50.8 |
| Total | | 1000.0 |

The above obtained coating compositions with 40% PVC and 30% VS (volume solids) were tested for early water repellency, durable water repellency, and durable ink repellency properties according to the test methods described above and results are given in Table 3.

As shown in Table 3, the binders of Comp Exs A and B comprising emulsion polymers prepared by polymerization of 2-EHA, ST and PEM (or MAA) in the presence of AR1025 surfactant failed to provide coatings with durable water and ink repellency properties (beading scores were all zero). The binder of Comp Ex C prepared from 30% LMA provided coatings with poor early water repellency (beading score for 2-hour drying: 3). The binders of Comp Exs D and E comprising emulsion polymers prepared in the presence of SR-1025 allyl reactive surfactant and DS-4 non-reactive surfactant, respectively, both provided coatings with poor durable ink repellency. The binder of Comp Ex F comprising the emulsion polymer with a calculated Tg of −46° C. provided coatings with poor durable ink repellency. The binder of Comp Ex G comprising 1% wax provided coatings with poor durable ink repellency.

In contrast, the inventive binders of Exs 1-7 comprising more than 1% of the wax in combination with emulsion polymers prepared by polymerization of 2-EHA, LMA, ST and PEM (or MAA) in the presence of AR1025 or RE-1000 surfactant provided coating films with excellent durable repellency to water and to ink (beading scores: 5) and good early water repellency. It is believed that synergetic effects between the emulsion polymer made from the long chain alkyl group ($C_9$-$C_{30}$) acrylic monomer with a specific surfactant in the polymerization process, in combination with a certain amount of the wax resulted in improvement of durable water repellency and durable ink repellency without compromising early water repellency (after 2-hour or 24-hour drying).

TABLE 3

Coating compositions and properties of coatings

| Coating Composition | Binder Type | Polymer Fox Tg, °C | Neutralizer | Early water repellency (2 h) | Early water repellency (24 h) | Durable water repellency | Durable ink repellency |
|---|---|---|---|---|---|---|---|
| Coating Comp Ex A-1 | Comp Ex A | −20 | AMP-95 | 5 | 5 | 0 | 0 |
| Coating Comp Ex A-2 | Comp Ex A | −20 | LiOH | 5 | 5 | 0 | 0 |
| Coating Ex 1-1 | Ex 1 | −20 | AMP-95 | 5 | 5 | 5 | 5 |
| Coating Ex 1-2 | Ex 1 | −20 | LiOH | 5 | 5 | 5 | 5 |
| Coating Ex 2-1 | Ex 2 | −20 | AMP-95 | 5 | 5 | 5 | 5 |
| Coating Ex 2-2 | Ex 2 | −20 | LiOH | 5 | 5 | 5 | 5 |
| Coating Comp Ex B-1 | Comp Ex B | −20 | AMP-95 | 5 | 5 | 0 | 0 |
| Coating Comp Ex B-2 | Comp Ex B | −20 | LiOH | 5 | 5 | 0 | 0 |
| Coating Ex 3-1 | Ex 3 | −20 | LiOH | 5 | 5 | 5 | 5 |
| Coating Ex 3-2 | Ex 3 | −20 | AMP-95 | 5 | 5 | 5 | 5 |
| Coating Comp Ex C-1 | Comp Ex C | −20 | LiOH | 3 | 5 | 5 | 5 |
| Coating Comp Ex C-2 | Comp Ex C | −20 | AMP-95 | 3 | 5 | 5 | 5 |
| Coating Ex 4-1 | Ex 4 | −20 | LiOH | 5 | 5 | 5 | 4 |
| Coating Ex 4-2 | Ex 4 | −20 | AMP-95 | 5 | 5 | 5 | 4 |
| Coating Comp Ex D-1 | Comp Ex D | −20 | LiOH | 5 | 5 | 5 | 3 |
| Coating Comp Ex D-2 | Comp Ex D | −20 | AMP-95 | 5 | 5 | 5 | 3 |
| Coating Comp Ex E-1 | Comp Ex E | −20 | LiOH | 5 | 5 | 5 | 3 |
| Coating Comp Ex E-2 | Comp Ex E | −20 | AMP-95 | 5 | 5 | 5 | 3 |
| Coating Ex 5-1 | Ex 5 | −20 | LiOH | 5 | 5 | 5 | 5 |
| Coating Ex 5-2 | Ex 5 | −20 | AMP-95 | 5 | 5 | 5 | 5 |
| Coating Comp Ex F-1 | Comp Ex F | −46 | LiOH | 5 | 5 | 5 | 3 |
| Coating Comp Ex F-2 | Comp Ex F | −46 | AMP-95 | 5 | 5 | 5 | 3 |
| Coating Comp Ex G | Comp Ex G | −20 | AMP-95 | 4 | 4 | 4 | 3 |
| Coating Ex 6 | Ex 6 | −20 | AMP-95 | 5 | 5 | 5 | 5 |
| Coating Ex 7 | Ex 7 | −20 | AMP-95 | 5 | 5 | 5 | 5 |

What is claimed is:

1. An aqueous dispersion comprising:
(A) an emulsion polymer with a Tg of −45° C. or more comprising, by weight based on the dry weight of the emulsion polymer,
from 1.0% to 2.0% of structural units of a polymerizable surfactant having the structural formula:

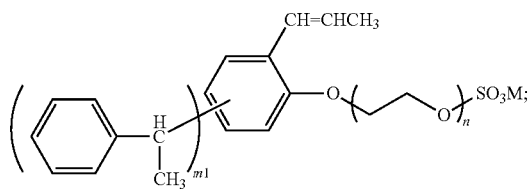

the structural formula:

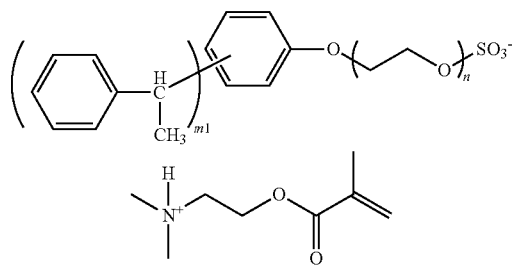

wherein:
m1 is 1, 2, or 3;
n is 2 to 50; and
M is Li$^+$, Na$^+$, K$^+$, or $^+$NH$_4$;
from 1% to 5% of structural units of methacrylic acid, phosphoethyl methacrylate, or a mixture thereof;
from 5% to 25% of structural units of a C$_{10}$-C$_{20}$-alkyl ester of (meth)acrylic acid; and
from 67 to 93.5% of structural units of at least one of styrene, 2-ethylhexyl acrylate, or methyl methacrylate; and
(B) from 1.5% to 20% by solids weight of a wax, based on the dry weight of the emulsion polymer.

2. The aqueous dispersion of claim 1, wherein n is an integer in the range of from 2 to 20.

3. The aqueous dispersion of claim 1, wherein the wax is a paraffin wax.

4. The aqueous dispersion of claim 1, wherein the emulsion polymer has a Tg in the range of from −35 to 20° C.

5. The aqueous dispersion of claim 1, wherein the C$_{10}$-C$_{20}$-alkyl ester of (meth)acrylic acid is selected from the group consisting of decyl acrylate, decyl methacrylate, isodecyl methacrylate, isodecyl acrylate, lauryl acrylate, lauryl methacrylate, icosyl acrylate, icosyl methacrylate, or mixtures thereof.

6. A method of preparing the aqueous dispersion of claim 1, comprising: admixing an emulsion polymer with from 1.5% to 20% by solids weight of a wax, based on the dry weight of the emulsion polymer;
wherein the emulsion polymer comprises, by weight based on the dry weight of the emulsion polymer,
from 1.0% to 2.0% of structural units of a polymerizable surfactant having the structural formula:

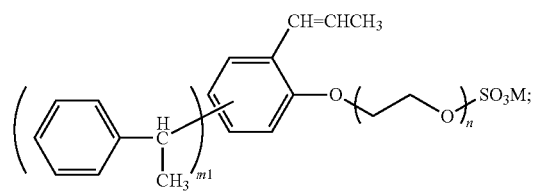

the structural formula:

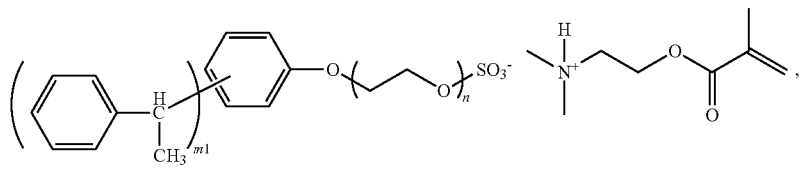

wherein:
m1 is 1, 2, or 3;
n is 2 to 50; and
M is $Li^+$, $Na^+$, $K^+$, or $^+NH_4$;
from 1% to 5% of structural units of methacrylic acid, phosphoethyl methacrylate, or a mixture thereof;
from 5% to 25% of structural units of a $C_{10}$-$C_{20}$-alkyl ester of (meth)acrylic acid; and
from 67 to 93.5% of structural units of at least one of styrene, 2-ethylhexyl acrylate, or methyl methacrylate.

7. An aqueous coating composition comprising the aqueous dispersion of claim 1.

8. The aqueous coating composition of claim 7, further comprising a pigment with a pigment volume concentration of 55% or less.

9. The aqueous coating composition of claim 8, wherein the pigment comprises titanium dioxide at a pigment volume concentration of 40%.

10. The aqueous dispersion of claim 1, wherein the $C_{10}$-$C_{20}$-alkyl ester of (meth)acrylic acid comprises lauryl methacrylate.

* * * * *